United States Patent [19]
Inagaki et al.

[11] Patent Number: 6,033,040
[45] Date of Patent: Mar. 7, 2000

[54] YAW MOMENT CONTROL SYSTEM IN VEHICLE

[75] Inventors: Hiromi Inagaki; Hideaki Shibue, both of Saitama, Japan

[73] Assignee: Honda Giken Kogyo Kabushiki Kaisha, Tokyo, Japan

[21] Appl. No.: 08/982,344

[22] Filed: Dec. 2, 1997

[30] Foreign Application Priority Data

Dec. 4, 1996 [JP] Japan ................................. 8-324323

[51] Int. Cl.$^7$ ................................ B60T 8/34; B60T 8/40; B60K 17/00

[52] U.S. Cl. ...................... 303/146; 303/140; 303/113.2; 303/116.3; 180/305

[58] Field of Search ............................. 303/146, 147, 303/148, 140, 113.2, 116.3; 180/305, 307, 308

[56] References Cited

U.S. PATENT DOCUMENTS

| | | | |
|---|---|---|---|
| 3,443,656 | 5/1969 | Stolz | 180/66 |
| 3,509,721 | 5/1970 | Crawford | 60/53 |
| 4,883,141 | 11/1989 | Walker | 180/243 |
| 5,101,925 | 4/1992 | Walker | 180/243 |
| 5,685,386 | 11/1997 | Kondo et al. | 180/76 |

*Primary Examiner*—Paul N. Dickson
*Assistant Examiner*—Jeffrey Woller
*Attorney, Agent, or Firm*—Armstrong, Westerman, Hattori, McLeland & Naughton

[57] ABSTRACT

A left hydraulic pump 3L connected to a left wheel and a right hydraulic pump 3R connected to a right wheel are interconnected by a first oil passage 21 and a second oil passage 22 to constitute a closed circuit. First and second variable throttle valves 8L and 8R are mounted between the first and second oil passages 21 and 22 and a tank 6. A first on-off valve 11L is disposed between two working chambers $9L_2$ and $9L_3$ of the left hydraulic pump 3L and the second oil passage 22, and a second on-off valve 11R is disposed between two working chambers $9R_2$ and $9R_3$ of the right hydraulic pump 3R and the first oil passage 21. For example, if the first variable throttle valve 8L is throttled, the pressure in the first oil passage 21 is risen to open the first on-off valve 11L, thereby increasing the amount of oil discharged from the first hydraulic pump 3L. As a result, the first and second hydraulic pumps 3L and 3R generate a braking force and a driving force respectively to generate a yaw moment in a rightward turning direction.

3 Claims, 6 Drawing Sheets

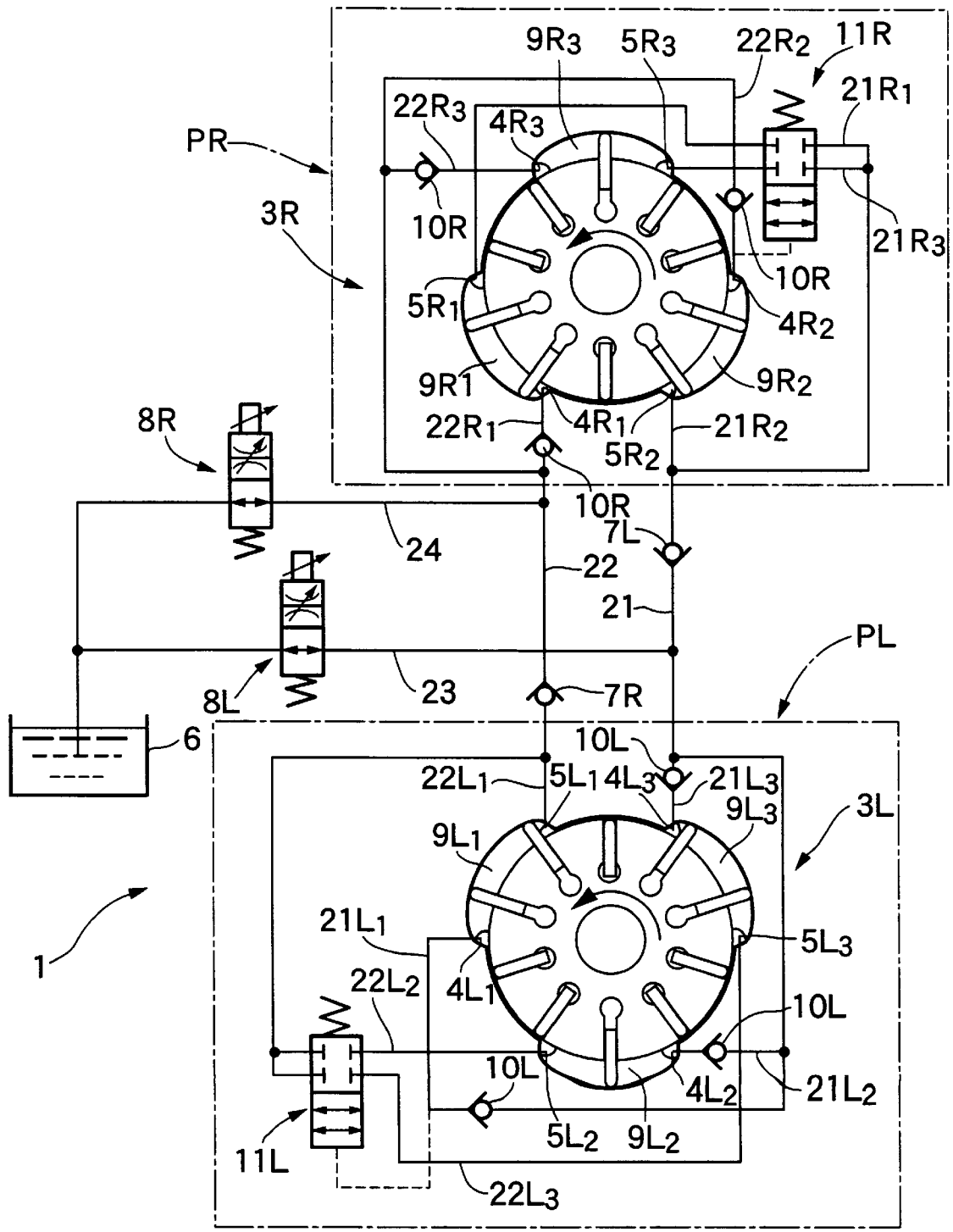
FIG. 2 — DURING NEUTRAL-STEERING

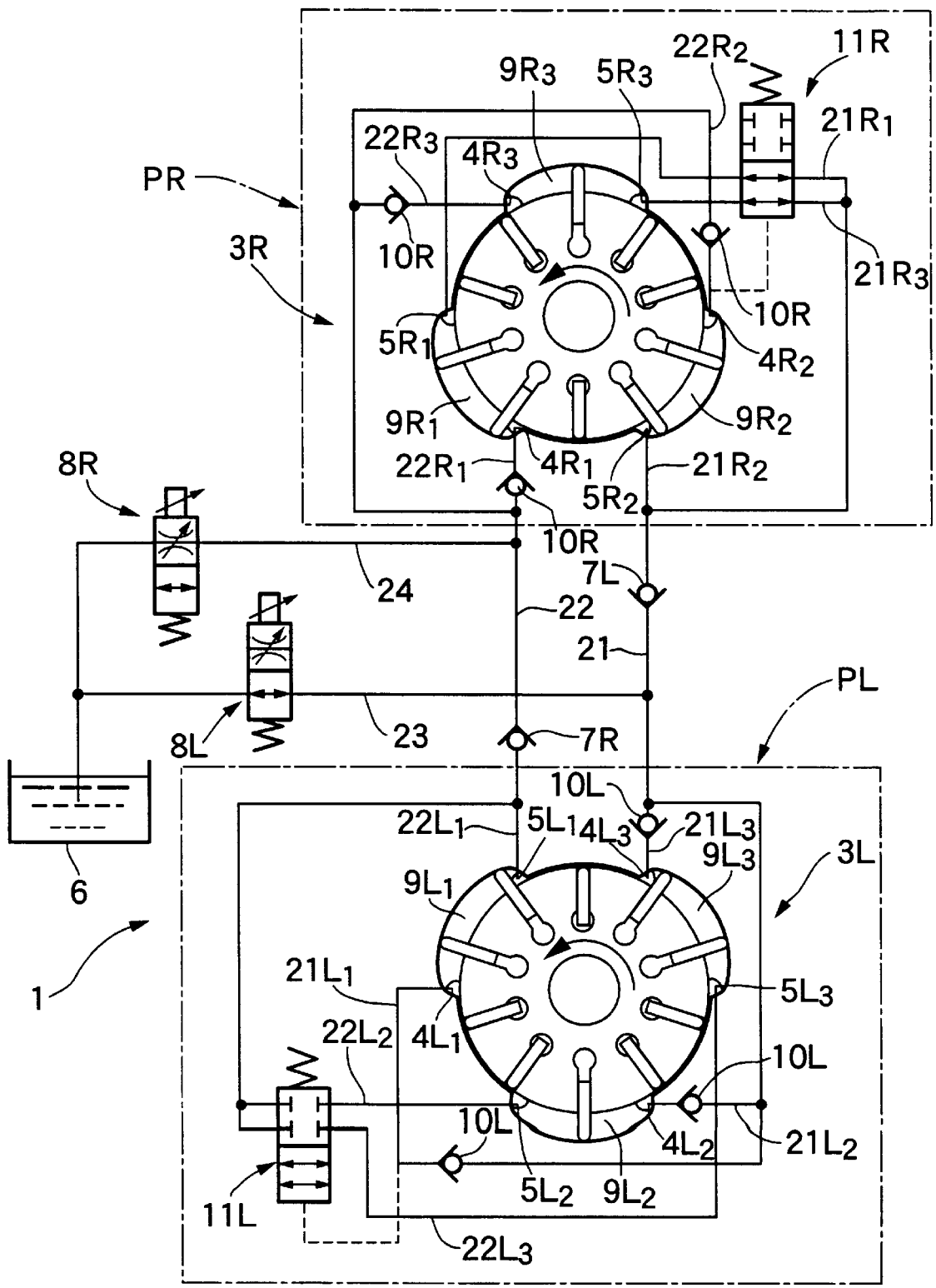
DURING OVER-STEERING  FIG.3

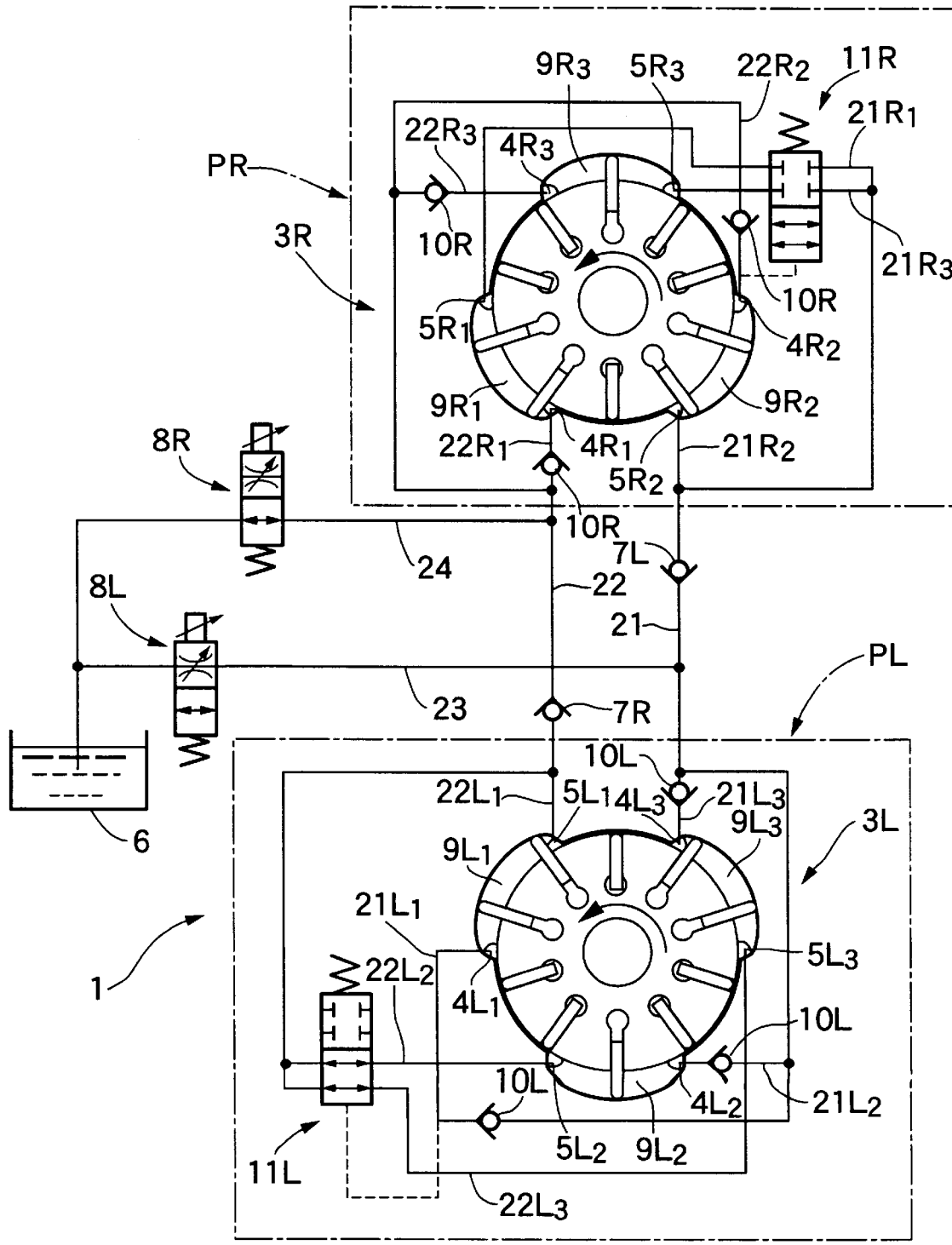
FIG.4 DURING UNDER-STEERING

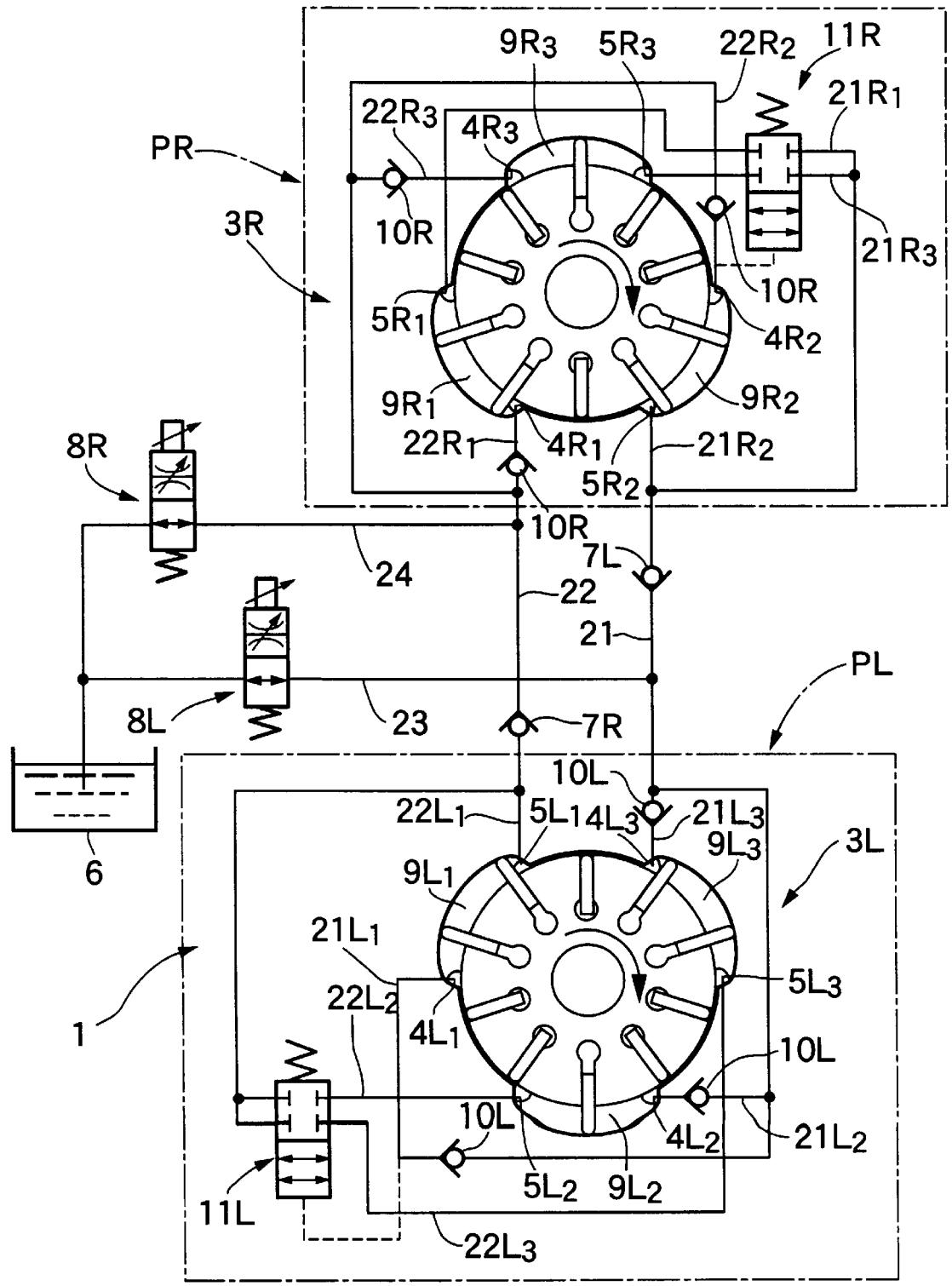

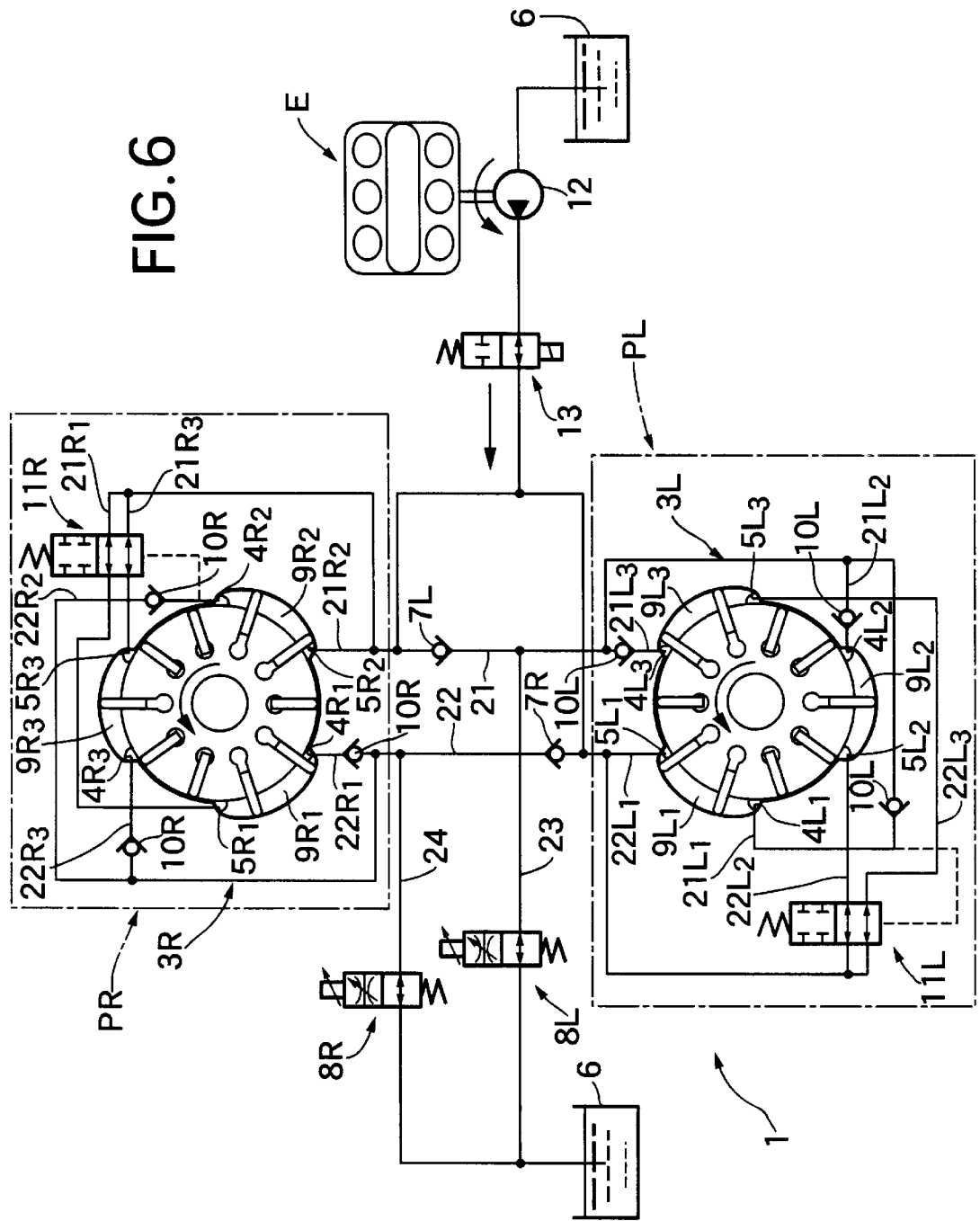

ially known yaw moment control system in a vehicle in which left and right follower wheels are interconnected by a gear box including a pair of hydraulic clutches, so that a yaw moment directed in a leftward turning direction is generated by bringing one of the hydraulic clutches into an engaged state to decelerate the left wheel and to accelerate the right wheel, and a yaw moment directed in a rightward turning direction is generated by bringing the other hydraulic clutch into an engaged state to decelerate the right wheel and to accelerate the left wheel.

In the known yaw moment control system, however, the gear box requires a pair of hydraulic clutches and a pair of gear trains, thereby forming a complicated structure and resulting in an increase in weight and cost.

SUMMARY OF THE INVENTION

The present invention has been conceived with the above circumstance in view, and it is an object of the present invention to provide a yaw moment control system in a vehicle which is small-sized, lightweight and lower in cost.

To achieve the above object, there is provided a yaw moment control system in a vehicle having at least rear a pair of right and left rear wheels, comprising a left hydraulic pump which is connected to the left rear wheel and rotated, a right hydraulic pump which is connected to the right rear wheel and rotated, a first oil passage interconnecting a discharge port of said left hydraulic pump and an intake port of said right hydraulic pump, a second oil passage interconnecting a discharge port of said right hydraulic pump and an intake port of the said left hydraulic pump, a first variable throttle valve mounted between said first oil passage and a tank, a second variable throttle valve mounted between said second oil passage and said tank, a first volume control means for increasing the volume of oil discharged from said left hydraulic pump in response to the closing of said first variable throttle valve, and a second volume control means for increasing the volume of oil discharged from said right hydraulic pump in response to the closing of said second variable throttle valve.

If both of the first and second variable throttle valves 8L and 8R are opened, the first and second oil passages 21 and 22 are connected to the tank 6, and both of the left and right hydraulic pumps 3L and 3R are brought into their non-loaded state, so that no driving force or no braking force is generated in the left and right rear wheels $W_{RL}$ and $W_{RR}$.

If the first variable throttle valve 8L is throttled, a hydraulic pressure is generated in the first oil passage 21, and the volume of oil discharged from the left hydraulic pump 3L is increased by the first volume control means 11L. Therefore, the left hydraulic pump 3L is permitted to function as a pump having a load to generate a braking force in the left rear wheel $W_{RL}$, while the right hydraulic pump 3R is permitted to function as a motor driven by the oil discharged by the left hydraulic pump 3L, thereby generating a driving force in the right rear wheel $W_{RR}$. As a result, a yaw moment directed in the leftward turning direction is generated, whereby an under-steering tendency can be eliminated if the vehicle is being turned leftwards, and an over-steering tendency can be eliminated if the vehicle is being turned rightwards.

If the second variable throttle valve 8R is throttled, a hydraulic pressure is generated in the second oil passage 22, and the volume of oil discharged from the right hydraulic pump 3R is increased by the second volume control means 11R. Therefore, the right hydraulic pump 3R is permitted to function as a pump having a load to generate a braking force in the right rear wheel $W_{RR}$, while the left hydraulic pump 3L is permitted to function as a motor driven by the oil discharged by the right hydraulic pump 3R, thereby generating a driving force in the left rear wheel $W_{RL}$. As a result, a yaw moment directed in the rightward turning direction is generated, whereby an over-steering tendency can be eliminated if the vehicle is being turned leftwards, and an under-steering tendency can be eliminated if the vehicle is being turned rightwards.

If the first variable throttle valve 8L is throttled to generate a hydraulic pressure in the first oil passage 21, the first volume control means 11L comprised of the pilot valve is opened to increase the volume of oil discharged from the left hydraulic pump 3L. If the second variable throttle valve 8R is throttled to generate a hydraulic pressure in the second oil passage 22, the second volume control means 11R comprised of the pilot valve is opened to increase the volume of oil discharged from the right hydraulic pump 3R.

If the oil discharged by the auxiliary hydraulic pump 12 driven by the engine E is supplied to the first and second oil passages 21 and 22 through the on-off valve 13, the left and right hydraulic pumps 3L and 3R function as the motors to generate a driving force and hence, a driving force can be generated in both of the left and right wheels to increase the traction of the vehicle.

BRIEF DESCRIPTION OF THE DRAWINGS

The present invention will be described by way of embodiments shown in the accompanying drawings.

FIGS. 1 to 5 illustrate a first embodiment of the present invention, where

FIG. 1 is an illustration of the entire arrangement of a vehicle equipped with a yaw moment control system;

FIG. 2 is an illustration of a hydraulic circuit of the yaw moment control system;

FIG. 3 is an illustration for explaining the operation during an over-steering;

FIG. 4 is an illustration for explaining the operation during an under-steering; and FIG. 5 is an illustration for explaining the operation during backward traveling of the vehicle.

FIG. 6 is an illustration of a hydraulic circuit of the yaw moment control system according to a second embodiment of the present invention.

DETAILED DESCRIPTION OF THE PREFERRED EMBODIMENTS

Figure 1:
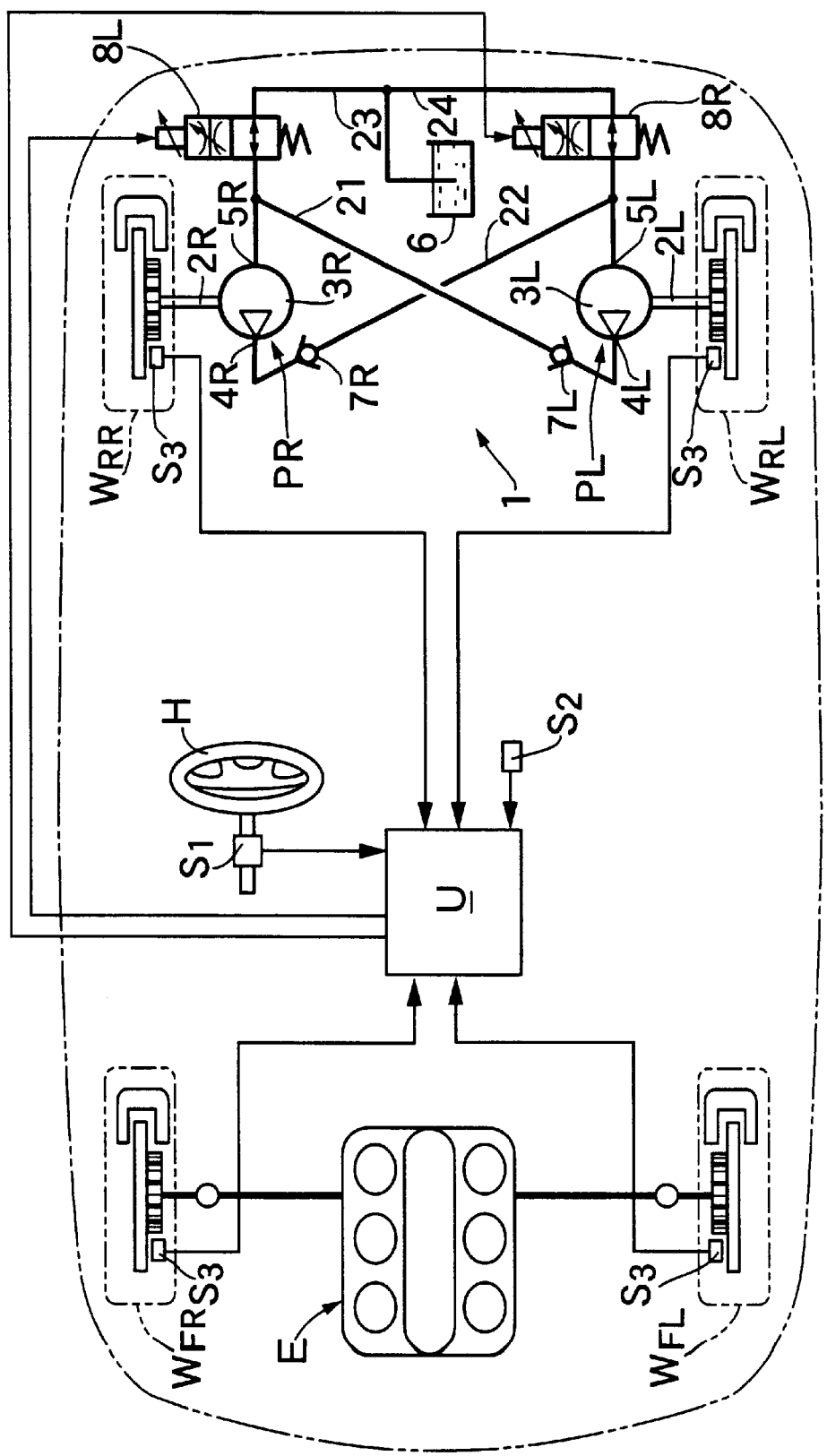

As shown in FIG. 1, a front engine front drive vehicle includes left and right front wheels $W_{FL}$ and $W_{FR}$ as driven wheels which are driven by an engine E mounted at a front portion of the vehicle, and left and right rear wheels $W_{RL}$ and $W_{RR}$ as follower wheels which are rotated with the traveling of the vehicle, the number of rotations of the follower wheels being controlled by a yaw moment control system 1.

The yaw moment control system 1 is comprised of a left pump unit PL including a left hydraulic pump 3L which is connected directly to and driven by an axle 2L of the left rear wheels $W_{RL}$, a right pump unit PR including a right hydraulic pump 3R which is connected directly to and driven by an axle 2R of the right rear wheels $W_{RR}$, a first oil passage 21 which interconnects a discharge port 4L of the left hydraulic pump 3R and an intake port 5R of the right hydraulic pump 3R, a second oil passage 22 which interconnects a discharge port 4R of the right hydraulic pump 3R and an intake port 5L of the left hydraulic pump 3L, a third oil passage 23 which connects the first oil passage 21 to a tank 6, a fourth oil passage 24 which connects the second oil passage 22 to the tank 6, a check valve 7L mounted in the first oil passage 21 for permitting the flow of an oil from the discharge port 4L of the left hydraulic pump 3L to the intake port 5R of the right hydraulic pump 3R, a check valve 7R mounted in the second oil passage 22 for permitting the flow of the oil from the discharge port 4R of the right hydraulic pump 3R to the intake port 5L of the left hydraulic pump 3L, a first variable throttle valve 8L comprised of a solenoid valve mounted in the third oil passage 23, and a second variable throttle valve 8R comprised of a solenoid valve mounted in the fourth oil passage 24.

Connected to an electronic control unit U comprised of a microcomputer are a steering angle sensor $S_1$, for detecting a steering angle based on a rotational angle of a steering wheel H, a yaw rate sensor $S_2$ for detecting a yaw rate of the vehicle, and wheel speed sensors $S_3$ for detecting a vehicle speed based on wheels speeds of the four wheels.

The detailed structures of the left and right pump units PL and PR will be described below with reference to FIG. 2.

The left hydraulic pump 3L of the left pump unit PL includes three working chambers $9L_1$ to $9L_3$ which include discharge ports $4L_1$ to $4L_3$ and intake ports $5L_1$ to $5L_3$, respectively. The right hydraulic pump 3R of the right pump unit PR includes three working chambers $9R_1$ to $9R_3$ which include discharge ports $4R_1$ to $4R_3$ and intake ports $5R_1$ to $5R_3$, respectively. The three discharge ports $4L_1$ to $4L_3$ of the left hydraulic pump 3L are connected to the three intake ports $5R_1$ to $5R_3$ of the right hydraulic pump 3R through the first oil passage 21 having the check valve 7L, while the three discharge ports $4R_1$ to $4R_3$ of the right hydraulic pump 3R are connected to the three intake ports $5L_1$ to $5L_3$ of the left hydraulic pump 3L through the second oil passage 22 having the check valve 7R. An intermediate portion of the first oil passage 21 is connected to the tank 6 through the third oil passage 23 having the first variable throttle valve 8L, while an intermediate portion of the second oil passage 22 is connected to the tank 6 through the fourth oil passage 24 having the second variable throttle valve 8R.

Check valves 10L are mounted in three oil passages $21L_1$ to $21L_3$ which are diverged from an upstream portion of the first oil passage 21 and connected to the three discharge ports $4L_1$ to $4L_3$ of the left hydraulic pump 3L, and three oil passages $21R_1$ to $21R_3$ which are diverged from a downstream portion of the first oil passage 21 are in communication with the three intake ports $5R_1$ to $5R_3$ of the right hydraulic pump 3R. Check valves 10R are mounted in three oil passages $22R_1$ to $22R_3$ which are diverged from an upstream portion of the second oil passage 22 and connected to the three discharge ports $4R_1$ to $4R_3$ of the right hydraulic pumdp 3R, and three oil passages $22L_1$ to $22L_3$ diverged from a downstream portion of the second oil passage 22 are in communication with the three intake ports $5L_1$ to $5L_3$ of the left hydraulic pump 3L.

A first on-off valve 11L as a first volume control means comprised of a pilot valve operated by a hydraulic pressure in the oil passage $21L_1$ is mounted in the two oil passages $22L_2$ and $22L_3$ connected to the intake ports $5L_2$ and $4L_2$ of the two working chambers $9L_2$ and $9L_3$ of the left hydraulic pump 3L. A second on-off valve 11R as a second volume control means comprised of a pilot valve operated by a hydraulic pressure in the oil passage $22R_2$ is mounted in the two oil passages $21R_1$ and $21R_3$ connected to the intake ports $5R_1$ and $5R_3$ of the two working chambers $9R_1$ and $9R_3$ of the right hydraulic pump 3R.

The operation of the first embodiment having the above-described arrangement will be described below.

The electronic control unit U calculates a reference yaw rate based on a steering angle detected by the steering angle sensor $S_1$ and a vehicle speed detected by the wheel speed sensors $S_3$, and compares the reference yaw rate with an actual yaw rate detected by the yaw rate sensor $S_2$. If the actual yaw rate is equal to the reference as a result of the comparison, it is determined that the steering is neutral, and as shown in FIG. 2, both of the first and second throttle valves 8L and 8R are maintained at their opened states.

In the opened states of the first and second throttle valves 8L and 8R, the first and second oil passages 21 and 22 communicate with the tank 6 through the third and fourth oil passages 23 and 24, respectively and hence, the pressure in the first and second oil passages 21 and 22 is the atmospheric pressure. At this time, both of the first and second on-off valves 11L and 11R are in their closed states, and the two working chambers $9L_2$ and $9L_3$ of the left hydraulic pump 3L have their intake ports $5L_2$ and $5L_3$ closed, and hence, their operations are stopped. In addition, the two working chambers $9R_1$ and $9R_3$ of the right hydraulic pump 3R have their intake port $5R_1$ and $5R_3$ closed, and hence, their operations are stopped.

Therefore, the left hydraulic pump 3L supplies the oil in the second oil passage 22 through the oil passage $22_1$, the intake port $5L_1$, the working chamber $9L_1$, the discharge port $4L_1$ and the oil passage $21L_1$ to the first oil passage 21. The right hydraulic pump 3R supplies the oil in the first oil passage 21 through the oil passage $21R_2$, the intake port $5R_2$, the working chamber $9R_2$, the discharge port $4R_2$ and the oil passage $22R_2$ to the second oil passage 22. At this time, the first and second oil passages 21 and 22 are under the atmospheric pressure as a result of opening of the first and second variable throttle valves 8L and 8R and hence, the left and right hydraulic pumps 3L and 3R are rotated with no load by the left and right rear wheels $W_{RL}$ and $W_{RR}$ to generate no driving force and no braking force.

If the actual yaw rate is greater than the reference yaw rate, an over-steering tendency is determined. For example, if the vehicle is being turned leftwards, a flow path resistance is generated in the fourth oil passage 24 by throttling the second variable throttle valve 8R connecting the second oil passage 22 and the tank 6 depending upon the degree of the over-steering tendency, as shown in FIG. 3. As a result, the pressure in the second oil passage 22 rises, and the second on-off valve 11R is opened by the pressure in the oil passage $22R_2$ upstream of the second oil passage 22, thereby bringing all of the three working chambers $9R_1$ to $9R_3$ of the right hydraulic pump 3R into their operative states. On the other hand, the first variable throttle valve 8L is in the opened state, so that the first oil passage 21 is maintained under atmospheric pressure. Therefore, the first on-off valve 11L is brought into the closed state, and only the one working chamber $9L_1$ of the left hydraulic pump 3L is brought into the operative state.

A load is generated in the right hydraulic pump 3R connected to the outer wheel during leftward turning of the vehicle by an increase in pressure in the second oil passage 22 which is a discharge oil passage of the right hydraulic pump 3R. Such a load causes the braking force to be applied to the outer wheel during turning of the vehicle. The amount of oil corresponding to a difference between the amount of oil discharged by the right hydraulic pump 3R with its three working chambers $9R_1$ to $9R_3$ being operative and the amount of oil discharged by the left hydraulic pump 3L with its single working chamber $9L_1$ being operative is supplied to the working chamber $9L_1$ of the left hydraulic pump 3L, permitting the left hydraulic pump 3L to function as the motor to drive it, thereby generating a driving force in the inner wheel during turning of the vehicle. If the braking force is generated in the outer wheel and the driving force is generated in the inner wheel during turning of the vehicle in the above manner, a yaw moment inhibiting the turning of the vehicle can be applied to eliminate the over-steering tendency.

If the actual yaw rate is less than the reference yaw rate, it is determined that there is an under-steering tendency. For example, if the vehicle is being turned leftwards, a flow path resistance is generated in the third oil passage 23 by throttling the first variable throttle valve 8L connecting the first oil passage 21 and the tank 6 depending upon the degree of the under-steering tendency. As a result, the pressure in the first oil passage 21 rises, and the first on-off valve 11L is opened by the pressure in the oil passage $21L_1$ upstream of the first oil passage 21, thereby bringing all of the three working chambers $9L_1$ to $9L_3$ of the left hydraulic pump 3L into their operative states. On the other hand, the second variable throttle valve 8R is in the opened state, so that the second oil passage 22 is maintained under the atmospheric pressure. Therefore, the second on-off valve 11R is brought into the closed state, and only the one working chamber $9R_2$ of the right hydraulic pump 3R is brought into the operative state.

A load is generated in the left hydraulic pump 3L connected to the inner wheel during leftward turning of the vehicle by an increase in pressure in the first oil passage 21 which is a discharge oil passage of the left hydraulic pump 3L. Such load causes the braking force to be applied to the inner wheel during turning of the vehicle. The amount of the oil corresponding to a difference between the amount of oil discharged by the left hydraulic pump 3L with its three working chambers $9L_1$ to $9L_3$ being operative and the amount of oil discharged by the right hydraulic pump 3R with its single working chamber $9R_2$ being operative is supplied to the working chamber $9R_2$ of the right hydraulic pump 3R, permitting the right hydraulic pump 3L to function as the motor to drive it, thereby generating a driving force in the outer wheel during turning of the vehicle. If the braking force is generated in the inner wheel and the driving force is generated in the outer wheel during turning of the vehicle in the above manner, a yaw moment assisting the turning of the vehicle can be applied to eliminate the under-steering tendency.

If the vehicle travels backwards, then the rotational directions of the motors 3L and 3R are reversed, as shown in FIG. 5, so that the oil drawn thereinto from the discharge ports $4L_1$ to $4L_3$ and $4R_1$ to $4R_3$ is discharged from the intake ports $5L_1$ to $5L_3$ and $5R_1$ to $5R_3$. However, the drawing of the oil is inhibited by the check valves 10L mounted in the oil passages $22L_1$ to $22L_3$ connected to the discharge ports $4L_1$ to $4L_3$ of the left hydraulic pump 3L and hence, the left hydraulic pump 3L is brought into a no-load state by radially inward retreating of its vane. Likewise, the drawing of the oil is inhibited by the check valves 10R mounted in the oil passages $22R_1$ to $22R_3$ connected to the discharge ports $4R_1$ to $4R_3$ of the right hydraulic pump 3R and hence, the right hydraulic pump 3R is brought into a no-load state by radially inward retreating of its vane. As a result, the control of the yaw moment is not carried out during backward traveling of the vehicle.

In the above manner, the yaw moment of the vehicle can be controlled to any extent to eliminate the undesirable over-steering and under-steering tendencies by the yaw moment control system 1 which is made smaller and lighter at a lower cost and in which the left and right hydraulic pumps 3L and 3R are only connected to each other by hydraulic circuit.

A second embodiment of the present invention will be described below with reference to FIG. 6.

The second embodiment is an improvement in the first embodiment. An auxiliary hydraulic pump 12 driven by the engine E is provided to supply the oil in the tank 6 to the first and second oil passages 21 and 22 through the on-off valve 13. If slippage of either of the front wheels $W_{FL}$ and $W_{FR}$ is detected based on a difference between the wheel speeds detected by the wheel speed sensors $S_3$ for the front wheels $W_{FL}$ and $W_{FR}$ which are the driven wheels and the wheel speeds detected by the wheel speed sensors $S_3$ for the rear wheels $W_{RL}$ and $W_{RR}$ which are the follower wheels, the electronic control unit U opens the on-off valve 13 to supply the oil to the first and second oil passages 21 and 22. As a result, the first and second on-off valves 11L and 11R are opened to permit the oil to be supplied to all the intake ports $5L_1$ to $5L_3$ and $5R_1$ to $5R_3$ of the left and right hydraulic pumps 3L and 3R, thereby causing the left and right hydraulic pumps 3L and 3R to function as the hydraulic motor to generate a driving force. At this time, that amount of a portion of the oil discharged from the discharge ports $4L_1$ to $4L_3$ and $4R_1$ to $4R_3$ which corresponds to the amount supplied from the auxiliary hydraulic pump 12 is returned to the tank 6 via the first and second variable throttle valves 8L and 8R.

Thus the vehicle can be brought into a four-wheel drive state to enhance the starting performance and the slope-ascending performance by driving the front wheels $W_{FL}$ and $W_{FR}$ by the engine E and driving the rear wheels $W_{RL}$ and $W_{RR}$ by the left and right hydraulic pumps 3L and 3R functioning as the hydraulic motors. Even in the second embodiment, if the first and second variable throttle valves 8L and 8R are opened or closed, the yaw moment can be controlled to eliminate the undesirable over-steering tendency or the under-steering tendency, as in the first embodiment.

Although preferred embodiments of the present invention have been described in detail, it will be understood that the present invention is not limited to the above-described embodiments, and various modifications in design may be made.

For example, although the first and second on-off valves 11L and 11R have been comprised of the pilot valves in the embodiments, they may be comprised of solenoid valves, so that the opening and closing of them can be controlled by a command from the electronic control unit U.

What is claimed is:

1. A yaw moment control system in a vehicle having at least a pair of right and left non-driven wheels, comprising:
   a left hydraulic pump which is connected to the left non-driven wheel and rotated;
   a right hydraulic pump which is connected to the right non-driven wheel and rotated;

a first oil passage interconnecting a discharge port of said left hydraulic pump and an intake port of said right hydraulic pump;

a second oil passage interconnecting a discharge port of said right hydraulic pump and an intake port of the said left hydraulic pump;

a first variable throttle valve mounted between said first oil passage and a tank;

a second variable throttle valve mounted between said second oil passage and said tank;

a first volume control means for increasing the volume of oil discharged from said left hydraulic pump in response to the closing of said first variable throttle valve; and a second volume control means for increasing the volume of oil discharged from said right hydraulic pump in response to the closing of said second variable throttle valve.

2. A yaw moment control system in a vehicle as recited in claim 1, wherein each of said left hydraulic pump and said right hydraulic pump includes a plurality of working chambers, respectively, wherein said first volume control means comprises a pilot valve operable to open an oil passage connected to an intake port of at least one of the working chambers in the left hydraulic pump in accordance with the pressure in said first oil passage, and wherein said second volume control means comprises a pilot valve operable to open an oil passage connected to an intake port of at least one of the working chambers in the right hydraulic pump in accordance with the pressure in said second oil passage.

3. A yaw moment control system in a vehicle according to claim 1, further including an auxiliary hydraulic pump driven by an engine, and an on/off valve operable to supply an oil discharged by said auxiliary hydraulic pump to said first oil passage and said second oil passage.

* * * * *